(12) United States Patent
Komiya et al.

(10) Patent No.: US 9,145,099 B2
(45) Date of Patent: Sep. 29, 2015

(54) ELECTRIC JUNCTION BOX

(71) Applicant: Yazaki Corporation, Tokyo (JP)

(72) Inventors: Yuki Komiya, Makinohara (JP); Hideki Kawamura, Makinohara (JP); Hiroki Tashiro, Makinohara (JP)

(73) Assignee: Yazaki Corporation, Tokyo (JP)

( * ) Notice: Subject to any disclaimer, the term of this patent is extended or adjusted under 35 U.S.C. 154(b) by 53 days.

(21) Appl. No.: 14/107,265

(22) Filed: Dec. 16, 2013

(65) Prior Publication Data

US 2014/0170868 A1    Jun. 19, 2014

(30) Foreign Application Priority Data

Dec. 19, 2012   (JP) ................................. 2012-276532

(51) Int. Cl.
  *H01R 12/00*   (2006.01)
  *H05K 1/00*   (2006.01)
  *B60R 16/023*  (2006.01)

(52) U.S. Cl.
  CPC .................................. *B60R 16/0238* (2013.01)

(58) Field of Classification Search
  CPC ............ B60R 16/0239; B60R 16/0238; B60R 16/023
  USPC .................................. 439/76.2, 76.1, 485, 487
  See application file for complete search history.

(56) References Cited

U.S. PATENT DOCUMENTS 6,881,077 B2 *   4/2005   Throum ....................... 439/76.1

FOREIGN PATENT DOCUMENTS

JP       2012-170204 A    9/2012
WO    WO-2012/111299 A1    8/2012

* cited by examiner

*Primary Examiner* — Javaid Nasri
(74) *Attorney, Agent, or Firm* — Locke Lord LLP

(57) ABSTRACT

Disclosed is an electric junction box dissipating heat generated by a bus bar toward components. The electric junction box 1 includes frame composed of a cassette block to which a plurality of components including a bus bar is attached, and a rack having the cassette block fitted thereinto. The cassette block includes component attachment part, and a connector fitting part into which a connector of a power source line input portion is fitted. The connector is electrically connected to the power source line input portion in the connector fitting part. The electric junction box includes a heat dissipation surrounding wall right above the connector fitting part. The heat dissipation surrounding wall is composed of a part of the cassette block and a part of the rack, inside which a heat dissipation space S is formed that any of the components avoids being attached to.

6 Claims, 5 Drawing Sheets ing box according to a first embodiment of the invention is discussed.

ELECTRIC JUNCTION BOX

CROSS REFERENCE TO RELATED APPLICATION

This application is on the basis of Japanese Patent Application NO. 2012-276532, the contents of which are hereby incorporated by reference.

TECHNICAL FIELD

This invention relates to electric junction boxes to be mounted on automobiles.

BACKGROUND ART

Onto an automobile an electric junction box is mounted. The electric junction box is formed into various types of configurations, and well known is, for example, what is provided with a frame to which a plurality of components is attached such as a bus bar, a connector, a relay, and a fuse and a cover covering an opening of the frame (see the PTL 1).

The bus bar is a wiring member made such that a metal plate is pressed, and is designed to branch power line from a battery or an alternator through the fuse or the relay.

CITATION LIST

Patent Literature

[PTL 1]
Japanese Patent Application Laid-Open Publication No. 2012-170204

SUMMARY OF INVENTION

Technical Problem

Disadvantageously, in the electric junction box mentioned above the bus bar generates heat by large current flowing, which adversely affects other components.

Therefore, an object of the invention is to provide an electric junction box capable of dissipating heat generated by the bus bar but not radiating toward other components.

Solution to Problem

In order to achieve the foregoing object, the invention according to one aspect is related to an electric junction box, including: a frame to which a plurality of components including a bus bar is attached, a heat dissipation surrounding wall disposed right above a predetermined portion of the bus bar in the frame, wherein any of the components avoids being attached to an inside of the heat dissipation surrounding wall.

Preferably, the frame is provided with a cassette block, and a rack into which the cassette block is fitted, and wherein the heat dissipation surrounding wall is composed of a part of the cassette block and a part of the rack.

Preferably, the frame is provided with a cassette block, and a rack into which the cassette block is fitted, and wherein the heat dissipation surrounding wall is formed integral with the the cassette block.

Preferably, a predetermined portion corresponds to a power source input of the bus bar.

Advantageous Effects of Invention

According to the invention, since the heat dissipation surrounding wall is disposed, the heat generated from the pre-determined portion of the bus bar dissipates upward where other components are not located without radiating toward other components.

According to the invention, since the heat generated from the power source input portion of the bus bar dissipates upward where other components are not located without radiating toward other components.

DESCRIPTION OF EMBODIMENTS

First Embodiment

Figure 1:
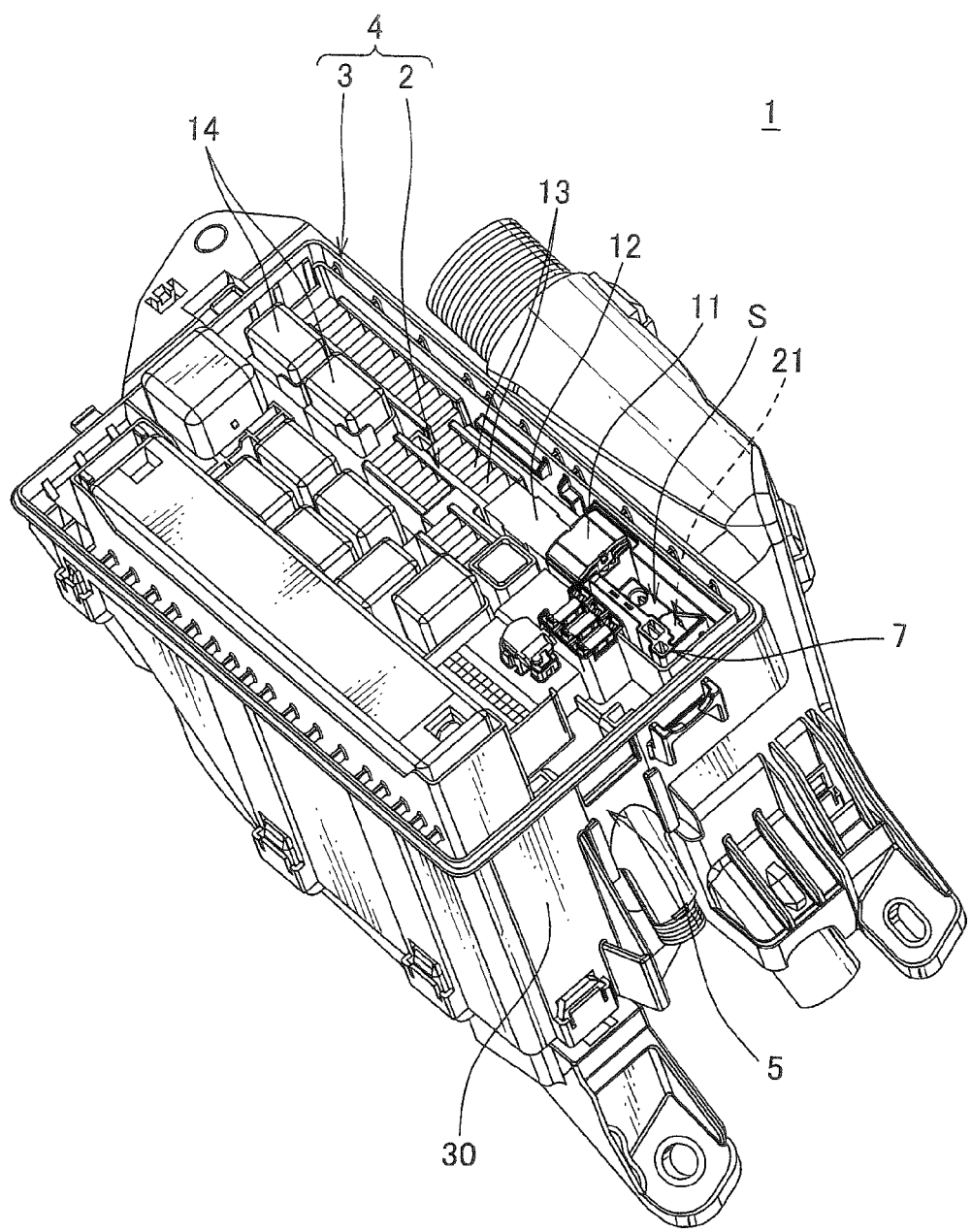
FIG. 1 is a perspective view illustrating an electric junction box according to a first embodiment of the invention.
Figure 2:
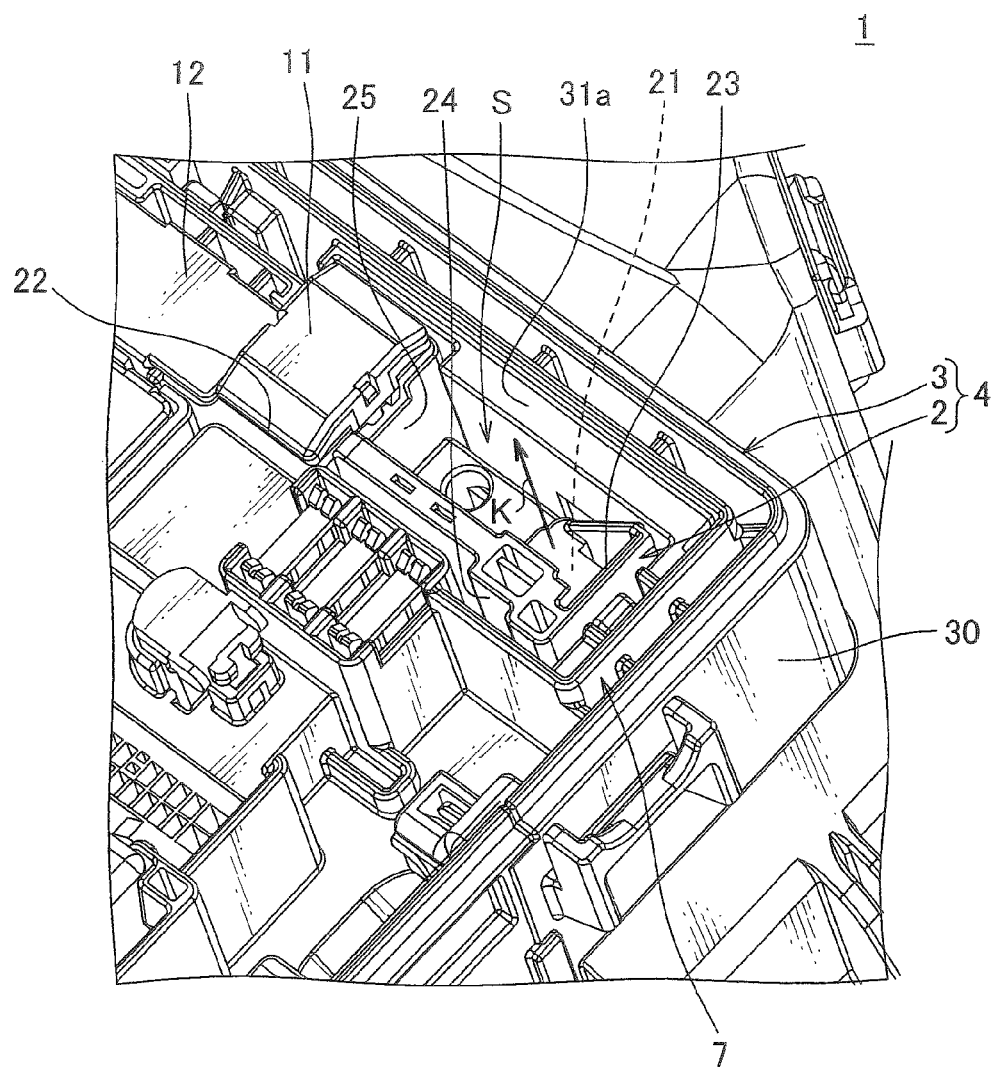
FIG. 2 is a enlarged view illustrating a main section of the electric junction box shown in FIG. 1.
Figure 3:
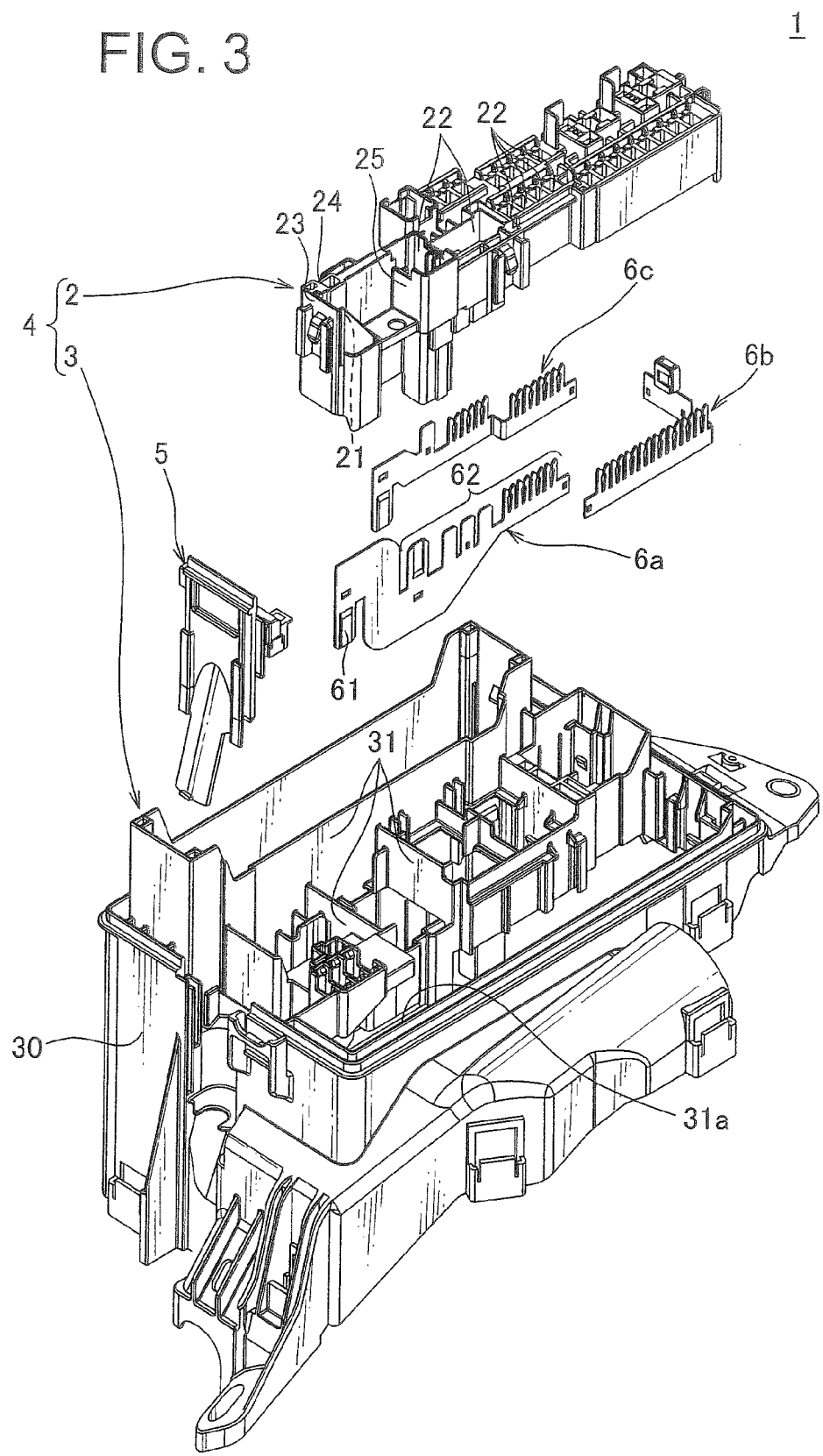
FIG. 3 is a exploded view illustrating the electric junction box shown in FIG. 1.

Referring now to FIGS. 1 to 3, an "electric junction box" according to a first embodiment of the invention is discussed. The electric junction box is designed to supply power and transmit signal to an electric component mounted onto an automobile.

As shown in FIGS. 1 to 3, the electric junction box 1 is provided with a frame 4, a plurality of components to be attached to the frame 4, a side cover 5, and an upper cover and a lower cover (not shown). The frame 4 is composed of a cassette block 2, and a rack 3 having the cassette block 2 fitted thereinto. The side cover 5 is attached to the rack 3. Also, the cassette block 2, the rack 3, the side cover 5, the upper cover, and the lower cover are made of synthetic resin.

The forgoing cassette block 2 is provided with a bus bar groove to which a plurality of bus bar 6*a*, 6*b*, and 6*c* shown in FIG. 3 are attached, a component attachment part 22 to which the fuse 11, 12, and 13 and the relay 14 shown in FIG. 1 are attached, and a connector fitting part 21 into which a connector of an input power source line is fitted.

The plurality of bus bars 6*a*, 6*b*, and 6*c* is a wiring member that is made as by pressing metal plate, which branches via the fuses 11, 12, and 13 or the relay 14 electric power from a battery and an alternator. Also, the bus bar 6*a* is provided with a power source input portion 61 arranged within the component attachment part 22 and electrically connected to the forgoing connector of the input power source line. The power source input portion 61 is a portion in the bus bar 6*a* especially subjected to high temperature.

The foregoing rack 3 is provided with a rack-shaped outer wall 30 and a plurality of inner walls 31 arranged inside the outer wall 30.

Also, as shown in FIG. 1, the electric junction box 1 is provided with a heart dissipation surrounding wall 7 just above the connector engagement part 21, i.e., just above the power source input portion 61. The heat dissipation surrounding wall 7 is composed of a part of the cassette block 2 and a part of the rack 3, inside which a heat dissipation space S is formed that any of the component avoids being attached to.

The heat dissipation surrounding wall 7 is, in detail, provided with three walls 23, 24, and 25 disposed in the cassette block 2, and an inner wall 31*a* disposed in the rack 3 as shown in FIG. 2. The three walls 23, 24, and 25 are continuous with each other in U-shape, and the wall 23 and the wall 25 are opposed to each other. By the cassette block 2 being fitted into the rack 3, the wall 24 and the inner wall 31a become opposed to each other.

In such the electric junction box 1, provision of the heat dissipation surrounding wall 7 just above the connector attachment part 21 makes the heat generated in the power source input portion 61 ("predetermined portion" in the claims) radiate upward where other components are not located without dissipating toward component attachment part 22 (a heat movement direction is shown by the arrow K in FIG. 2).

Second Embodiment

Figure 4:
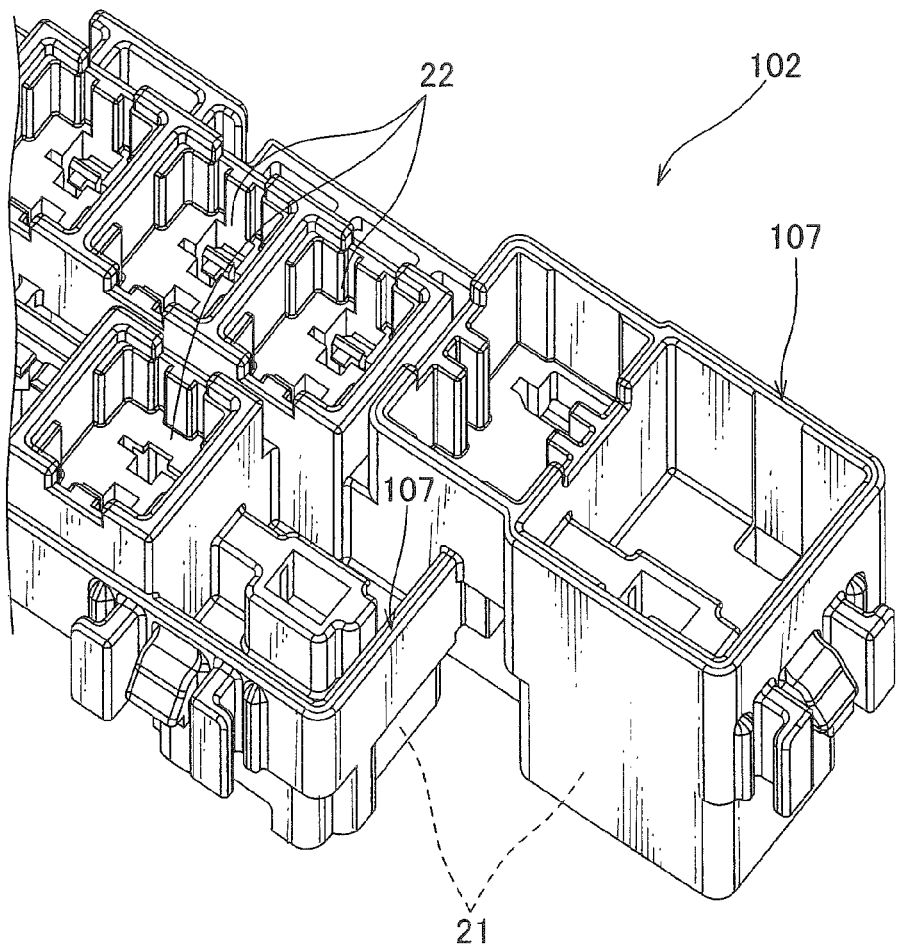
FIG. 4 is a perspective view illustrating a cassette block composing the electric junction box according to a second embodiment of the invention.
Figure 5:
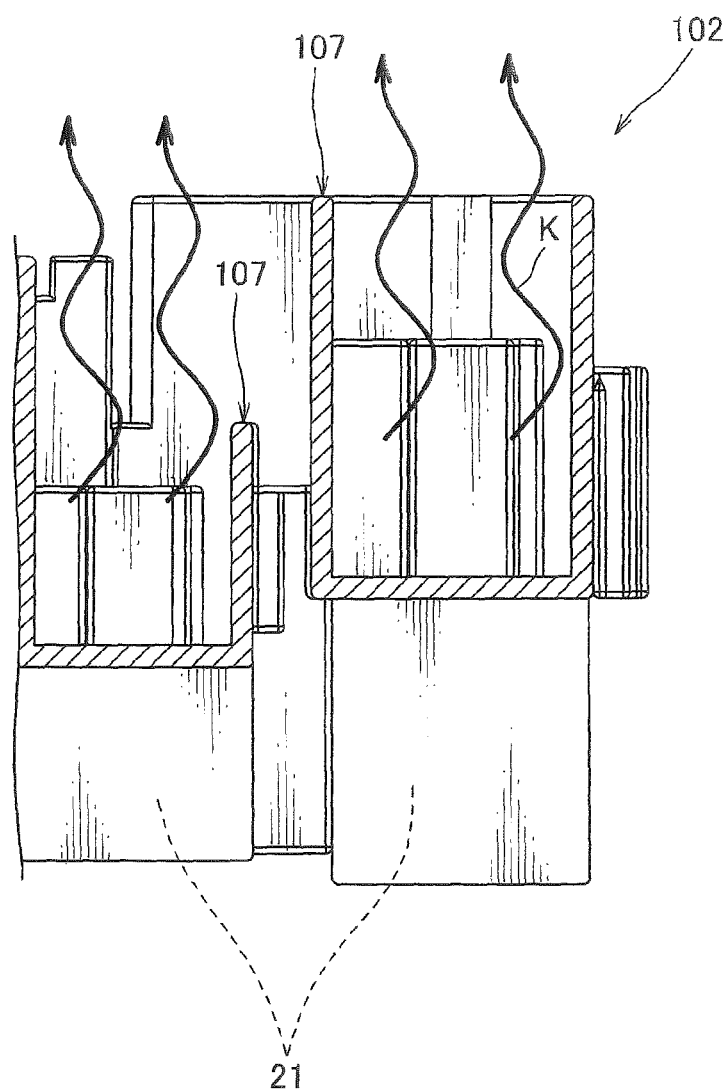
FIG. 5 is a cross-sectional view of the cassette block shown in FIG. 4.

Referring now to FIGS. 4 and 5, an "electric junction box" related to a second embodiment is discussed. In the FIGS. 4 and 5 the same element as the aforementioned first embodiment is provided with the same reference sign and is not repeated here to discuss.

In this embodiment, the frame is composed of a cassette block 102, and a rack (not shown) into which the cassette block 102 is fitted. Also, in this embodiment, the heat dissipation surrounding wall 107 is formed integral with the cassette block 102 as shown in FIG. 4.

In such the electric junction box, as is the case with the electric junction box of the first embodiment, the heat dissipation surrounding wall 107 is disposed just above the connector attachment part 21, and thereby the heat generated in the power source input portion is made possible to radiate upward where other components are not located without dissipating toward component attachment part 22 (a heat movement direction is shown by the arrow K in FIG. 5).

Furthermore, while in the first embodiment and the second embodiment mentioned above, the frame is composed of separated cassette block and rack, the cassette block and the rack may, in the present invention, be formed integrally.

Furthermore, while in the first embodiment and the second embodiment mentioned above, the heat dissipation surrounding wall 7 or 107 is disposed just above the cassette attachment part 21, i.e., the power source input portion 61, the heat dissipation surrounding wall in the invention may be disposed just above any portion such as but not limited to the power source input portion 61, where heat dissipation of the bus bar is required.

Note that the aforementioned embodiments merely typically discloses the present invention, and are not intended to limit the invention. Namely, unless otherwise such changes and modifications depart from the scope of the present invention hereafter defined, they should be construed as being included therein.

REFERENCE SIGNS LIST 1 electric junction box
2, 102 cassette block
3 rack
4 frame
6a bus bar
7, 107 heat dissipation surrounding wall
61 poser source input part (predetermined portion)

The invention claimed is:

1. An electric junction box, comprising:
a frame to which a plurality of components including a bus bar is attached; and
a heat dissipation surrounding wall disposed surrounded with only side walls just above a predetermined portion of the bus bar in the frame,
wherein any of the components avoids being attached to an inside of the heat dissipation surrounding wall so as to dissipate upwardly heat generated from the predetermined portion.

2. The electric junction box as claimed in claim 1, wherein the frame is provided with a cassette block, and a rack having the cassette block fitted thereinto, and wherein the heat dissipation surrounding wall is composed of a part of the cassette block and a part of the rack.

3. The electric junction box as claimed in claim 2, wherein the predetermined portion corresponds to a power source input portion of the bus bar.

4. The electric junction box as claimed in claim 1, wherein the frame is provided with a cassette block, and a rack having the cassette block fitted thereinto, and wherein the heat dissipation surrounding wall is formed integral with the cassette block.

5. The electric junction box as claimed in claim 4, wherein the predetermined portion corresponds to a power source input portion of the bus bar.

6. The electric junction box as claimed in claim 1, wherein the predetermined portion corresponds to a power source input portion of the bus bar.

* * * * *